Aug. 19, 1958 P. FORMAN 2,848,674
DRIFT-FREE MAGNETIC AMPLIFIER CIRCUIT SYSTEM
Filed May 26, 1955

INVENTOR.
PHILIP FORMAN
BY
Carl Miller
ATTORNEY 2,848,674
Patented Aug. 19, 1958

2,848,674

DRIFT-FREE MAGNETIC AMPLIFIER CIRCUIT SYSTEM

Philip Forman, Brooklyn, N. Y., assignor to American Macromotive Corporation, Brooklyn, N. Y., a corporation of New York Application May 26, 1955, Serial No. 511,169

6 Claims. (Cl. 318—207)

This invention relates to amplifier circuits and the like, and particularly to what I choose to term drift-free magnetic amplifier circuits.

The main object of my invention is to produce amplifier systems having drift-free magnetic circuits that amplify with fidelity through a wide range of frequencies and degrees of amplification.

Another object of my invention is to have such an amplifying system that can assume more than one form of execution and that is therefore capable of variation.

A further object of this invention is to provide a magnetic amplifier circuit that is especially free from parasitic voltages and spurious signals of the fundamental signalling frequency normally arising from defects in conventional designs of such circuits and systems.

In accordance with my invention there is provided a magnetic amplifier circuit energized by a source of alternating current having a frequency which is an integral multiple of the frequency of the signal to be amplified, and a load that is sensitive to voltages of the signal frequency but insensitive to the spurious voltages produced by the magnetic amplifier of frequencies other than the signal frequency.

Other objects and advantages of my invention will appear in greater detail as the specification proceeds.

Figure 1:
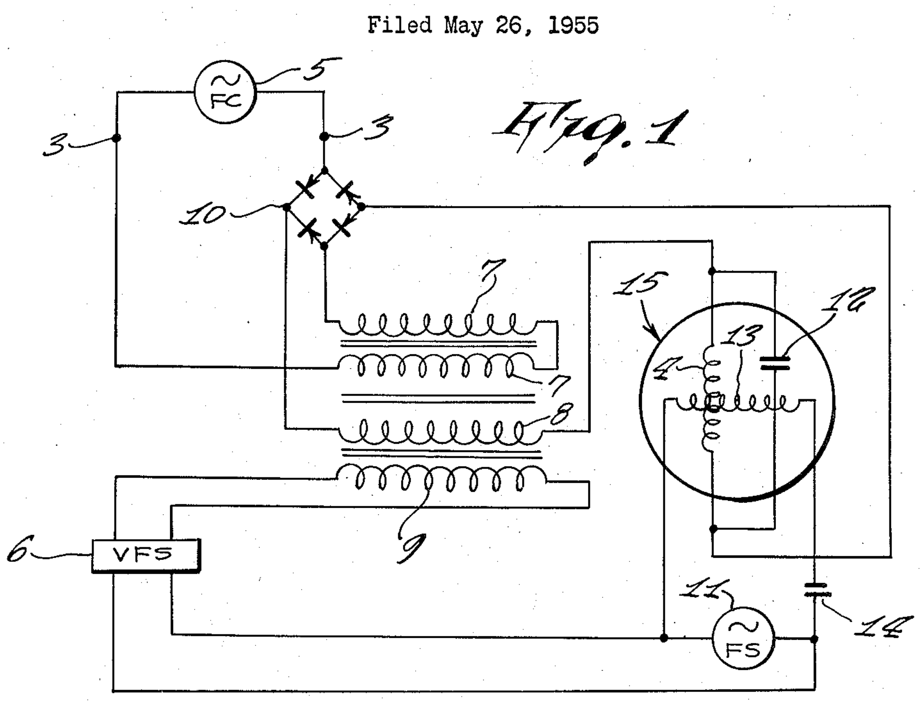
Figure 2:
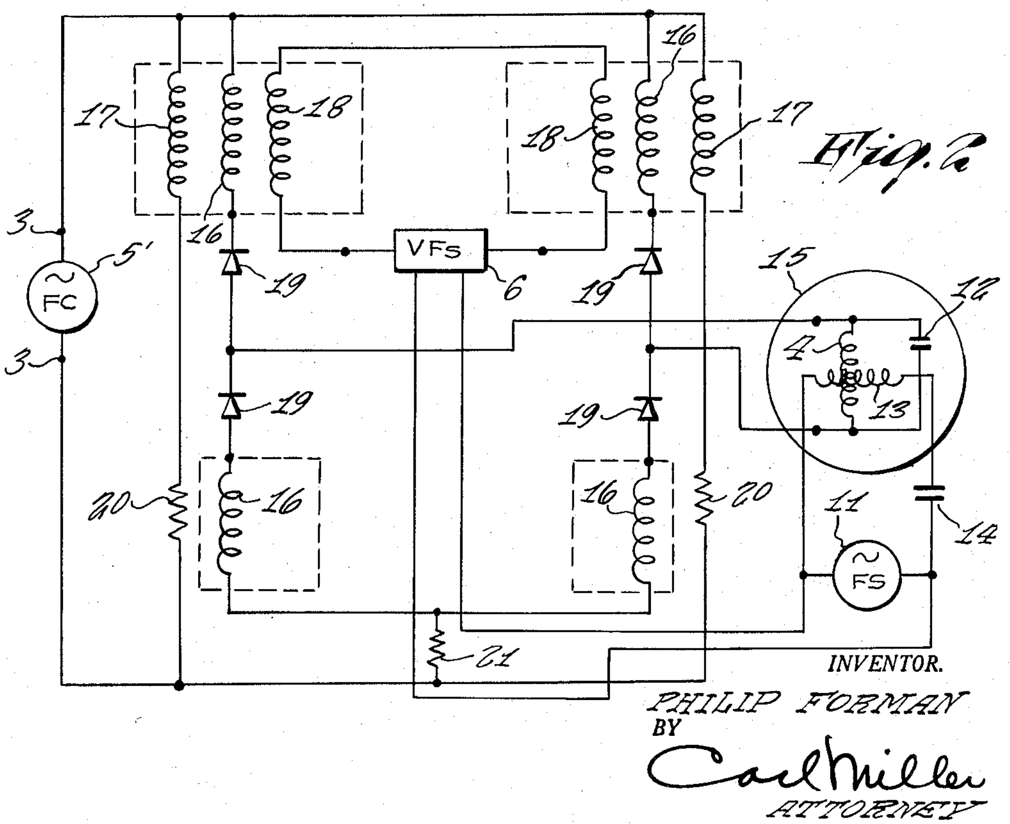

In order to facilitate ready comprehension of this invention for a proper appreciation of the salient features thereof, the invention is illustrated merely by way of non-limiting examples in the accompanying drawing forming part hereof, and in which:

Figure 1 is a circuit of a magnetic amplifier system made according to my invention; and Figure 2 is a circuit diagram of another magnetic amplifier system forming a modification of that shown in Figure 1 and operating according to the same principles as the latter.

In these figures, the same reference numerals indicate the same or like parts and features.

In the highly developed electrical and electronic fields, magnetic amplifiers have been developed that are capable of producing a relatively large power output in response to a feeble power input signal. Such magnetic amplifiers have an input-output characteristic that varies with ageing, ambient temperature and other conditions such as variations in supply voltage and supply frequency. These variations in the input-output characteristic cause spurious and undesirable output voltages that affect the load in a way unrelated to the input signal. This adverse property limits the scope of application in which magnetic amplifiers may be used, for if the drift of characteristic of a magnetic amplifier causes spurious output voltages of the same frequency and order of magnitude as that generated by an input signal, the magnetic amplifier is impaired in amplifying input signals of that frequency and level. Upon considering this problem, it has occurred to me that with a novel design including certain novel principles in arrangement of a circuit, the parasitic voltages and other extraneous undesired signals of fundamental signal frequency will be eliminated, which will become more clear from the following description.

Hence, in the practice of my invention, and referring particularly to Figure 1, an external feed-back magnetic amplifier is shown having power terminals 3, 3 connected to an alternating current source 5. This source of energizing current may have a frequency that is, by way of example, five times the frequency of the signal to be amplified, supplied by the source 6. The power windings 7, the positive feed back winding 8 and the control winding 9 are constructed in any well known manner so that such details need not be dwelt upon here, but are well within the scope of the amplifier art. Windings 7, 8 and 9 are wound on a core which is preferably of saturable type material as is well known in the art. A bridge connected rectifier 10 then interconnects power winding 7, alternating current source 5, feedback winding 8, and load 4 so that an alternating voltage is applied across power windings 7 while a unidirectional voltage is applied across load 4 and feedback winding 4.

In the specific embodiment of Figure 1, load 4 is the control winding of a two phase servo-motor 15.

A tuning condenser 12 is connected in parallel with the servo-motor control winding or load 4 in order to improve the wave form of the output voltage, while a phase-shift condenser 14 is connected in series with the reference winding 13 of servo-motor 15 in order to obtain a maximum torque from this servo-motor.

Inasmuch as the mentioned reference winding 13 of the servomotor 15 is excited from the alternating current source 11, the servo-motor will respond only to signal voltages having the same frequency, F*s*, as is generated by alternating current source 11 and will be entirely insensitive to all other frequencies.

In operation of the device of Figure 1, the power windings have the alternating potential of frequency F*c* impressed thereon from source 5 while the load 4 has the rectified voltage of source 5 applied thereon in series with power winding 10. So long as no signal appears on winding 9, the voltage applied to windings 7 and 8 is insufficient to saturate the magnetic core on which the windings are wound so that the windings have an extremely high impedance. It will be understood, as is schematically indicated by the use of a double power winding 7 that the usual double core construction is used to prevent subsequent saturation of the core due to the unbalanced action of windings 7 and 8. Therefore, substantially all the alternating voltage of source 5 appears on winding 7 with substantially no voltage falling on load 4.

With the appearance of a signal of the same frequency as F*s* appearing on signal output means 6, which is smaller than the frequency of source 5 and is at the sensitive frequency of load 4, the voltage time energization applied to the magnetic core from windings 7, 8 and 9 (during the cycle that the polarity of the signal energization is the same as the polarity of the feedback energization) will be sufficient to cause saturation of the magnetic core. Once the core has saturated, the positive feedback from winding 8 will keep the core saturated so long as the control signal polarity corresponds to the feedback signal polarity. Accordingly, the frequency sensitive load 4 will conduct a current for the number of cycles of source 5 which corresponds to one half cycle of signal source 6 through windings 7 and 8 which have an extremely low impedance when their core is saturated.

When the polarity of signal source 6 reverses, and opposes the polarity of winding 8, the core will then unsaturate and will remain unsaturated during this half cycle of signal source energization whereby load 4 will be deenergized.

From the foregoing, it is apparent that load 4 is energized during every other half cycle of signal source 6 by a unidirectional current from source 5. Therefore, the load 4 is energized by a power signal having the same frequency as that of its predetermined sensitive frequency.

In the above, it has been assumed that the voltage of signal source 6 is in phase with the voltage of source 11 whereby a first phase relationship is established between windings 4 and 13 to rotate the rotor of servo motor 15 in a first direction. When however the phase of a signal from signal source 6 is reversed with respect to the phase of source 11, it is apparent that the phase of the energizing signal on winding 4 will reverse with respect to winding 13. Hence, the rotor of servo 15 will rotate in an opposite direction.

It is evident that the noise and drift output voltages will not contain any frequency component equal to the frequency of the alternating current source 11 that excites reference winding 13 of the servo-motor 15. This follows since the drift voltages are related only to the frequency of the source 5. Consequently, with no signal input present, no torque producing output will be produced, and the magnetic amplifier zero or null point is essentialy drift free.

Figure 2 shows a second embodiment of my novel invention as applied to a full wave output magnetic amplifier. In the case of Figure 2, power windings 16 correspond to windings 7 of Figure 2, bias windings 17 correspond to feedback winding 8 of Figure 1 and signal windings 18 correspond to signal winding 9 of Figure 1. In the case of Figure 2, however, windings 16, 17 and 18 on the upper right of the figure and windings 16, 17 and 18 on the upper left of the drawing have independent magnetic structures. As indicated by the dotted boxes, left-hand and right-hand windings belong to the right-hand and left-hand structure respectively.

The rectifiers 19 on the right and left sides of Figure 2 serve the same purpose for their respective magnetic circuits as did rectifier 10 of Figure 1 for the single magnetic circuit shown therein. Thus, voltage source 5 of Figure 2 which corresponds to source 5 of Figure 1 can energize frequency sensitive load 4 at a first polarity through the left-hand power winding 16 and at an opposite polarity through the right-hand power winding 16.

Figure 2 further shows the use of current limiting resistors 20 and 21 in series with bias windings 17 and power windings 16 respectively. The double winding construction for windings 16 for each magnetic circuit is once again used to prevent subsequent core saturation due solely to the unbalanced energization of the bias and power windings.

So long as no signal is emitted from signal source 6 (which is of the same frequency as that of source 11 but of smaller frequency than that of source 51), each of the magnetic systems will be always unsaturated and load 4 will not be energized. Upon the occurrence of a signal however, and during the positive half cycle of that signal, the net voltage applied to the windings of the left hand structure will be sufficient to saturate the core at some point on the positive half wave of the voltage applied by source 5′ (this particular point depending on the magnitude of the signal). A circuit is then completed from source 5′, resistor 21, lower right-hand winding 16, lower right-hand diode 19, load 4, upper left-hand diode 19, upper left-hand winding 16, and the other side of source 5′.

During this time, the right-hand magnetic structure is unsaturated and its windings have substantial impedance.

It is to be noted that the net voltage applied to load 4 during the half cycle of source 5′ is dependent upon the magnitude of signal source voltage 6.

During succeeding half cycles, the left hand core remains saturated so that load 4 is energized by a unidirectional signal during this half cycle of source 6.

When the signal voltage of source 6 reverses during its next half cycle, the right hand magnetic structure will saturate and operate as described above for the left hand side, while the left hand magnetic structure will be maintained unsaturated. However, it is clear that when the right hand structure unsaturates, the unidirectional current through the load 4 for the duration of the negative half cycle of source 6 will be of an opposite polarity to that through load 4 during the preceeding half cycle of load conduction.

Accordingly, a relatively strong signal of the same frequency as that of the signal source is impressed on the frequency sensitive load.

It is to be understood that when load 4 is a servo motor such as motor 15, that the direction of rotation of motor 4 depends upon the phase of signal voltage from source 6 with respect to the phase of the reference voltage from source 11.

In the foregoing, I have described my invention solely in connection with specific illustrative embodiments thereof. Since many variations and modifications of my invention will now be obvious to those skilled in the art, I prefer to be bound not by the specific disclosures herein contained but only by the appended claims.

Having now fully described my invention, I claim:

1. A drift-free magnetic amplifier system for operating a two phase servo-motor comprising a magnetic amplifier circuit having a pair of power input terminals, an output, and a control input; a first source of alternating voltage of a first frequency; means connecting said first source to both a reference winding of said motor and to a signal controlling device; means connecting said signal controlling device to said control input; a second source of alternating voltage of a second frequency, said second source being connected to said power input terminals for supplying energizing current thereto, said second frequency being selected to be an integral multiple of said first frequency; and means connecting said output with a control winding of said motor, whereby drift signals in said output will be related harmonically to said first frequency and will be ineffective to cause operation of said motor.

2. A drift-free magnetic amplifier system according to claim 1, wherein said magnetic amplifier circuit comprises a bridge having bias, control and output windings in two of its arms, and separate output windings in the other two arms, said bias-windings being connected in parallel with said pair of power input terminals, each of said output windings being connected in series with a pair of rectifiers and one of said separate output windings across said power input terminals, said control windings being connected in series with said control input, and said output being taken from the junctions between each pair of rectifiers.

3. A drift-free magnetic amplifier system according to claim 1, wherein said magnetic amplifier circuit comprises a single magnetic core supporting a pair of power windings, a control winding, and an external feed back winding, said pair of power windings being connected in series with one set of conjugate points of a rectifier bridge across said pair of power input terminals, said control winding being connected with said control input, and said feedback winding being connected in series with the other set of conjugate points of said rectifier bridge across said output.

4. A drift free magnetic amplifier system for energizing a load sensitive to a predetermined frequency; said magnetic amplifier comprising a power winding, feedback winding and control winding wound on a core of saturable type material; said power winding being connected in series with an alternating current source of power having a first frequency; circuit connections for connecting said load with rectified output of said power winding; said control winding being energized from a signal source having a second frequency smaller than said first frequency; said feedback winding including circuit connections from said load for driving said saturable core to saturation responsive to a signal voltage of a predetermined polarity applied to said control winding; said load conducting a unidirectional current from said source of power of said first frequency for a substantial portion of duration of said signal voltage of predetermined polarity; said saturable core being unsaturated when said signal voltage polarity reverses.

5. A drift free magnetic amplifier system for energizing a load sensitive to a predetermined frequency; said magnetic amplifier comprising a power winding, feedback winding and control winding wound on a core of saturable type material; said power winding being connected in series with an alternating current source of power having a first frequency; circuit connections for connecting said load with rectified output of said power winding; said control winding being energized from a signal source having a second frequency smaller than said first frequency; said feedback winding including circuit connections from said load for driving said saturable core to saturation responsive to a signal voltage of a predetermined polarity applied to said control winding; said load conducting a unidirectional current from said source of power of said first frequency for a substantial portion of duration of said signal voltage of predetermined polarity; said saturable core being unsaturated when said signal voltage polarity reverses; the phase relationship of energization of said frequency sensitive load with respect to a fixed frequency source being reversed when the phasing of said control signal is reversed.

6. A drift free magnetic amplifier system for energizing a load sensitive to a predetermined frequency; said magnetic amplifier comprising a power winding, feedback winding and control winding wound on a core of saturable type material; said power winding being connected in series with an alternating current source of power having a first frequency; circuit connections for connecting said load with rectified output of said power winding; said control winding being energized from a signal source having a second frequency smaller than said first frequency; said feedback winding including circuit connections from said load for driving said saturable core to saturation responsive to a signal voltage of a predetermined polarity applied to said control winding; said load conducting a unidirectional current from said source of power of said first frequency for a substantial portion of duration of said signal voltage of predetermined polarity; said saturable core being unsaturated when said signal voltage polarity reverses; said frequency sensitive load having an output voltage at said sensitive frequency only upon the occurrence of said signal voltage independently of small variations of frequency and voltage of said source of first frequency and variation of characteristics of said magnetic amplifier.

References Cited in the file of this patent

UNITED STATES PATENTS

| | | |
|---|---|---|
| 2,710,313 | Logan | June 7, 1955 |
| 2,717,346 | Geyger | Sept. 6, 1955 |